United States Patent Office 3,383,226
Patented May 14, 1968

3,383,226
REFRACTORY
William M. Hildinger and Jacques R. Martinet, Santa Clara, Calif., assignors to Kaiser Aluminum & Chemical Corporation, Oakland, Calif., a corporation of Delaware
No Drawing. Continuation-in-part of application Ser. No. 358,954, Apr. 10, 1964. This application June 6, 1966, Ser. No. 555,244
9 Claims. (Cl. 106—58)

ABSTRACT OF THE DISCLOSURE

A refractory composition resistant to slag erosion in steel-making furnaces, having a cokable, carbonaceous bond and a coarse fraction resting on 100 mesh and containing 75%–98.5% MgO, CaO and $SiO_2$ in a weight ratio of from 1.4:1 to 2.8:1, not over 3% impurities, and a minor amount of finely divided periclase containing at least 96% MgO.

---

This application is a continuation-in-part of patent application S.N. 358,954, filed Apr. 10, 1964 now abandoned.

This invention concerns refractories, particularly refractories containing cokable, carbonaceous bonding agents.

The use of "tar" bonded refractories, that is refractories composed of refractory grains held or bonded together by a cokable, carbonaceous bonding agent such as tar or pitch, has increased greatly in recent years, due principally to the use of such refractories in vessels for refining steel by the basic oxygen or L–D process. Accordingly, there is a desired in the industry for such a refractory which shows good resistance to erosion and wear under the conditions obtaining in an oxygen steel vessel.

According to the present invention, metallurgical furnace linings of superior resistance to attack by corrosive or erosive slag or furnace environments are obtained by production of such linings from a refractory composition consisting essentially of from 60 to 80 parts by weight of a coarse refractory grain of particle sizing at least 95% retained on 100 mesh and containing from 75% to 98.5% MgO and having CaO and $SiO_2$ present in a weight ratio of from 1.4:1 to 2.8:1, from 15 to 35 parts by weight of finely divided refractory particles containing at least 96% MgO and from 2 to 5 parts by weight of a cokable, carbonaceous bonding agent. For instance, a suitable periclase or magnesia coarse grain component has been found to be such grain containing about 98% MgO, 0.9% CaO and 0.4% $SiO_2$ or up to about 1.5% CaO plus $SiO_2$, the remainder being principally impurities such as $Fe_2O_3$, $Al_2O_3$, and $B_2O_3$, as well as $Cr_2O_3$.

In one advantageous embodiment, a refractory consisting essentially of from 60 to 80 parts by weight coarse magnesia refractory grain containing from 75 to 90% MgO and from 8 to 25% CaO and $SiO_2$, the ratio of CaO to $SiO_2$ being from 1.4:1 to 2.8:1, from 15 to 35 parts by weight of a finely divided magnesia refractory grain containing at least 96% MgO and from 2 to 5 parts by weight of a cokable, carbonaceous bonding agent, shows such superior properties. Herein, the coarse refractory grain is, mineralogically, an agglomeration of small magnesia crystallites held in a matrix of calcium silicate or calcium-magnesium silicate material.

The coarse grain is suitably made by firing a magnesia-yielding material, for example magnesium carbonate or magnesium hydroxide, together with sufficient $SiO_2$ and CaO so that the weight ratio between these two components is as specified above. The grain can be produced in a rotary kiln or a shaft kiln or other suitable firing device.

One preferred form of the coarse grain contains from 81 to 83% MgO, from 14% to 19% CaO and $SiO_2$, and has a CaO to $SiO_2$ ratio of from 1.87:1 to 2.45:1. In any event the grain preferably contains, other than MgO, CaO and $SiO_2$, less than 3% impurities. Preferably at least 95% of the coarse grain is retained on a 100 mesh screen, and for optimum results at least 50% is retained on a 14 mesh screen. In a preferred form, all of the coarse grain passes a ⅜-inch screen.

The finely divided refractory grain is a high purity periclase or magnesia grain containing at least 96% MgO. At least 90%, and preferably 98%, of the particles of the finely divided grain pass a 100 mesh screen; preferably at least 50% pass a 325 mesh screen. The finely divided refractory grain is made by firing or burning a magnesia-yielding material, for example, magnesium carbonate or magnesium hydroxide, of the requisite purity in a rotary, shaft, or other kiln.

The cokable carbonaceous bonding agent can be any such tar or pitch known in the art. It can be a tar of relatively low softening point, for example 150° F., or it can be a pitch of higher softening point, for example, one with a softening point by the cube-in-air method of 250° F. or higher, in either flake or powder form. If a low softening point tar is used, it is preferably added in a molten state. If a pitch of higher softening point is used it can be added in the solid state; and is preferably added together with a solvent for such pitch. A suitable solvent is the product obtained from the first fractions of coal tar distillation, for example, from the carbonization of bituminous coal, being the material of commerce known as neutral oil or coal tar distillate oil or coal tar limpid oil or heavy oil. When a solvent is used with the high softening point pitch, the solvent is preferably added in an amount from 1% to 3% of the total batch weight. A high softening point pitch, particularly one with a softening point of from 300° to 320° F., added together with a solvent, is a preferred form of the cokable carbonaceous bonding material. The pitch can be of a size such that at least 90% passes a 65 mesh screen, but a finer material, for example 90% passing a 100 mesh screen and 70% passing a 325 mesh screen, is preferred.

Refractory shapes can be made from the composition of this invention by any of the processes known in the art. For example, the refractory grain can be mixed together, preferably in a hot state, e.g., from 90° F. to 150° F., and the carbonaceous bonding agent added, either as a molten tar or as solid pitch together with a solvent. Shapes can be formed by means well known in the art, for example, under relatively high pressure, e.g., at least 10,000 p.s.i.; or under light pressure, up to 3000 p.s.i., together with vibration.

It has been found advantageous to incorporate in the refractory batch of this invention the amount of solvent described above, to form bricks from the batch, and then to heat at about 200° C. for at least 8 hours, or until there is a weight loss in the bricks of at least 40% of the amount of solvent added. This procedure results in greatly improved strengths of the brick at pre-coking temperatures.

It is an advantage of refractories according to the present invention that, after having been heated in an atmosphere deficient in oxygen to temperatures at which the pitch in the refractory has decomposed leaving a residue of coke, for example at temperatures above 1000° C., they show superior resistance to erosion and other forms of wear. The reasons for this superior erosion resistance are not thoroughly understood, but it is believed that the finely divided, high purity magnesia grains resist attack by the slags and fumes adjacent the refractory while it is in use and hold the coarser refractory grains in place to maintain a coherent refractory. It is also believed that in one embodiment coarser, calcium silicate-containing refractory grains, which are believed to be more susceptible to slag attack, form a refractory slag on the exposed face of the refractory and prevent oxidation of the coke, which acts as a bonding agent in the refractory and which also forms a surface on the refractory which is not wetted by the slag of the steel making process.

The following examples are presented as illustrative and non-limiting examples of the mode of practicing this invention.

EXAMPLE 1

Seventy-one parts of coarse magnesite grain are mixed with 24.8 parts of finely divided periclase grain in a muller mixer for one minute. The coarse grain has the following chemical analysis: $Cr_2O_3$, 0.20%, $Fe_2O_3$, 0.45%; $Al_2O_3$, 0.30%; CaO, 11.82%; $SiO_2$, 5.25%; and MgO (by difference) 81.98%. It will be noted that the weight ratio of CaO to $SiO_2$ is 2.25:1. The coarse grain is of a size such that all passes a ⅜-inch screen and all is retained on a 100 mesh screen, with 65.6% retained on a 14 mesh screen. The finely divided periclase grain has the following chemical analysis: $SiO_2$, 0.37%; CaO, 1.08%; $Fe_2O_3$, 0.26%; $Al_2O_3$, 0.05%; $Cr_2O_3$, 0.13%; and MgO (by difference) 98.11%. The size of the finely divided grain is such that 98.8% passes a 100 mesh screen and 71.5% passes a 325 mesh screen. Both grains are at a temperature of 130° F. during mixing. After the refractory grains have been mixed for one minute, 1.2 parts of neutral oil are added and the mixing continued for two additional minutes. After this, 3.0 parts by weight of pulverized pitch having a softening point (by the cube-in-air method) of 305° F. is added and the mixing continued for three additional minutes, making a total mixing time of six minutes. The pulverized pitch is of a size such that 93.4% passes a 100 mesh screen and 73.4% passes a 325 mesh screen. A temperature of 130° F. is maintained throughout the mixing operation. After mixing and before the batch has cooled, it is pressed into shapes in a power press, the formed shapes having an average density of 183.0 pounds per cubic foot. The formed shapes are then dried or cured on a schedule which raises the temperature of the drier from 150° C. to 200° C. over the course of six hours and holds it at that temperature for eight hours. At the end of this time, the shapes show a weight loss equal to 41% of the weight of neutral oil added.

EXAMPLE 2

As a further example of the practice of this invention and as a demonstration of the superior erosion resistance of refractories made according to this invention, shapes were made, and are reported as test compositions A through D, from 61.4 parts of a coarse grain having the following chemical analysis: MgO, 81.39%; CaO, 11.95%; $SiO_2$, 5.40%; $Fe_2O_3$, 0.47%; $Al_2O_3$, 0.51%; $Cr_2O_3$, 0.28%; and 33.0 parts of finely divided grain of the chemical analyses shown in Table 1.

The shapes were made by mixing, at 130° C., the indicated proportions of the different grains with 5.5 parts of molten tar having a softening point, by the ring and ball method, of 157° F., and forming by vibration pressing. The shapes were placed in a small test oxygen converter having an outside diameter of about 3 feet. The converter was used to make eight heats of steel according to the oxygen process, each heat taking about 15 minutes for the complete cycle. After this use test, the refractory shapes showed the erosion, expressed as a percentage of their original thickness of 4½", indicated in Table 1. A comparison of specimen A with specimen D, wherein the coarse and fine grains had the same chemical composition, and contained only about 81% MgO, shows the distinct superiority of a composition using the two types of grains, the coarse having the calcium silicate matrix and the fine being the high purity periclase. Also, a comparison of specimens A, B, and C shows the desirability of using high purity magnesia, that is magnesia with at least 96% MgO, for the fine grain. Thus, the erosion of specimen B, having a fine grain with 95.8% MgO, showed an erosion of 7.6%, whereas specimen A, having a fine grain periclase containing 97.8% MgO, showed an erosion of only 4.2%.

TABLE 1.—ANALYSIS OF FINELY DIVIDED GRAIN (PERCENT)

| Composition | MgO | CaO | $SiO_2$ | $Fe_2O_3$ | $Al_2O_3$ | $Cr_2O_3$ | Impurities | L.O.I. | Erosion, Percent |
|---|---|---|---|---|---|---|---|---|---|
| A | 97.8 | 1.0 | 0.4 | 0.2 | 0.1 | 0.1 | 0.3 | 0.1 | 4.2 |
| B | 95.8 | 2.5 | 0.7 | 0.3 | 0.2 | 0.1 | 0.3 | 0.1 | 7.6 |
| C | 92.4 | 1.1 | 5.5 | 0.4 | 0.2 | 0.0 | 0.3 | 0.1 | 8.3 |
| D¹ | 81.39 | 11.95 | 5.40 | 0.47 | 0.51 | 0.28 | | | 7.6 |

¹ Same as analysis of coarse grain.

EXAMPLE 3

In addition, Composition E was prepared wherein both the coarse and the finely divided grains had the following analysis: 0.4% $SiO_2$, 1.0% CaO, 0.26% $Fe_2O_3$, 0.05% $Al_2O_3$, 0.13% $Cr_2O_3$ and 98.16% MgO (by difference). From the table it can be seen that the erosion resistance is greatly improved by incorporation of periclase containing at least 96% MgO as the finely divided component and by using as refractory oxide particulate material containing CaO and $SiO_2$ in a weight ratio of from 1.4:1 to 2.8:1.

A refractory batch was prepared from these grains and formed into bricks under a pressure of 6¼ tons per sq. inch, heated to 250° C. at a rate of temperature increase of 10° C. per hour, and held at 250° C. for 3 hours, the pressed bricks exhibiting an average bulk density of 190.9 p.c.f.; and cold crushing strength after coking of 6520 p.s.i. In an erosion test comparable to that of the compositions in the above table, Composition E bricks exhibited an erosion loss of 4.8%.

The incorporation of neutral oil as a solvent is particularly advantageous in the present invention. When specimens made according to Example 1 were subjected to a test wheren they were crushed after being introduced into a furnace held for various periods of time at 500° C., the minimum strength exhibited was 36 p.s.i., occurring after a holding time at 500° C. of 15 minutes. By way of comparison, a composition was prepared which was identical to that of Example 1 except that 1.7 parts of heavy oil were used instead of neutral oil; and after preparation identical with that in Example 1, specimens of this composition showed a minimum strength in the 500° C. crushing test of only 9 p.s.i. The heavy oil mentioned hereinabove typically exhibits a maximum distillation at 270° C. of 5%, at 315° C. of 15% and from about 25% to 43% at 350° C. The typical distillation range for neutral oil is essentially from about 210° C. to around 300° C.

The products of this invention are particularly useful for lining basic oxygen steel converters, but can be used wherever tar bonded refractories are desired. Although the compositions according to this invention are partiularly useful for forming refractory shapes, it will be understood that such compositions can be used in loose or granular form, as for ramming or tamping or casting a monolithic refractory structure.

The neutral oil used in Examples 1 and 3 was a distillate derived from tar produced by the carbonization of bituminous coal with the bulk of tar acids and naphthalene removed. It had a specific gravity (15° C./15°

C.) of 1.037 and contained less than 2% water. It showed the following typical distillation properties: to 210° C., 5.1%; to 235° C., 29.5%; to 270° C., 82.7%; and to 300° C., 93.2%.

In the specification and claims, percentages and parts are by weight unless otherwise indicated. Mesh sizes referred to herein are Tyler standard screen sizes which are defined in Chemical Engineers' Handbook, John H. Perry, editor-in-chief, third edition, 1950, published by McGraw-Hill Book Company, at page 963. For example, a size passing a 100 mesh screen corresponds to 147 microns and that passing 200 mesh, to 74 microns. Analyses of mineral components are reported in the usual manner, expressed as simple oxides, e.g., MgO, $SiO_2$, although the components may actually be present in various combinations, e.g., as magnesium silicate. The grains are employed in brickmaking size ranges, according to good practice in this art, within the ranges defined herein.

Having now described the invention, what is claimed is:

1. A refractory composition resistant to slag attack consisting essentially of: from 60 to 80 parts by weight coarse refractory grain containing from 75% to 90% MgO and from 8% to 25% by weight CaO and $SiO_2$, the weight ratio of CaO to $SiO_2$ in said grain being from 1.4:1 to 2.8:1, said coarse grain containing not over 3% impurities and being at least 95% retained on a 100 mesh screen; from 15 to 35 parts by weight of finely divided refractory grain containing at least 96% MgO, at least 90% of said finely divided grain passing a 100 mesh screen; and from 2 to 5 parts by weight of a cokable, carbonaceous bonding agent.

2. A refractory composition resistant to slag attack consisting essentially of: from 60 to 80 parts by weight coarse refractory grain containing from 75% to 90% MgO and from 8% to 25% by weight CaO and $SiO_2$, the weight ratio of CaO to $SiO_2$ in said grain being from 1.4:1 to 2.8:1, said coarse grain containing not over 3% impurities and being at least 95% retained on a 100 mesh screen and 50% retained on a 14 mesh screen; from 15 to 35 parts by weight of finely divided refractory grain containing at least 96% MgO, at least 90% of said finely divided refractory grain passing a 100 mesh screen; and from 2 to 5 parts by weight of a pulverized cokable carbonaceous bonding agent having a softening point of at least 250° F., 90% of said pulverized bonding agent passing a 65 mesh screen and 47% passing a 100 mesh screen.

3. A refractory composition resistant to slag attack consisting essentially of: from 60 to 80 parts by weight coarse refractory grain containing from 75% to 90% MgO, and from 8% to 25% by weight CaO and $SiO_2$, the weight ratio of CaO to $SiO_2$ in said grain being from 1.4:1 to 2.8:1, the balance being not over 3% impurities, said coarse grain being at least 95% retained on a 100 mesh screen; from 15 to 35 parts by weight of finely divided refractory grain containing at least 96% MgO, at least 90% of said finely divided refractory grain passing a 100 mesh screen; and from 2 to 5 parts by weight of a pulverized cokable carbonaceous bonding agent having a cube-in-air softening point of at least 250° F., 90% of said pulverized bonding agent passing a 100 mesh screen.

4. A refractory batch providing resistance to slag attack consisting essentially of: from 60 to 80 parts by weight coarse refractory grain containing from 75% to 90% MgO, from 8% to 25% by weight CaO and $SiO_2$, the weight ratio of CaO to $SiO_2$ in said grain being from 1.4:1 to 2.8:1, and not over 3% impurities, said coarse grain all passing a ⅜-inch screen and being at least 95% retained on a 100 mesh screen and 50% being retained on a 14 mesh screen; from 15 to 35 parts by weight of finely divided refractory grain containing at least 96% MgO, 90% of said finely divided refractory grain passing a 100 mesh screen and 50% passing a 325 mesh screen; from 2 to 5 parts by weight pulverized pitch having a softening point of from 300 to 320° F., 90% of said pulverized pitch passing a 100 mesh screen and 70% passing a 325 mesh screen; and from one to three parts by weight of a solvent for said pitch.

5. A refractory batch providing resistance to slag attack consisting essentially of: from 60 to 80 parts by weight coarse refractory grain containing from 81% to 83% MgO, and from 14% to 19% by weight CaO and $SiO_2$, the weight ratio of CaO to $SiO_2$ in said grain being from 1.4:1 to 2.45:1, the balance of said grain being not over 3% impurities, said coarse grain all passing a ⅜-inch screen and being 95% retained on a 100 mesh screen and 50% being retained on a 14 mesh screen; from 15 to 35 parts by weight of finely divided refractory grain containing at least 96% MgO, 98% of said finely divided refractory grain passing a 100 mesh screen and 50% passing a 325 mesh screen; from 2 to 5 parts by weight pulverized pitch having a softening point of from 300 to 320° F., 90% of said pulverized pitch passing a 100 mesh screen and 70% passing a 325 mesh screen; and from 1 to 3 parts by weight of a solvent for said pitch.

6. Batch as in claim 5 wherein said solvent is neutral oil.

7. A refractory composition resistant to slag attack consisting essentially of from 60 to 80 parts by weight coarse refractory grain containing from 75% to 98.5% MgO and having CaO and $SiO_2$ present in a weight ratio of from 1.4:1 to 2.8:1, said coarse grain containing not over 3% impurities and being at least 95% retained on 100 mesh; from 15 to 35 parts by weight of finely divided refractory particles containing at least 96% MgO, at least 90% of said finely divided particles passing 100 mesh; and from 2 to 5 parts by weight of a cokable, carbonaceous bonding agent.

8. Refractory composition as in claim 7 containing also from 1% to 3% of the total batch weight of neutral oil.

9. Shaped refractory made of the composition of claim 8 and cured to 250° C. until at least 40% of said neutral oil has distilled off.

References Cited

UNITED STATES PATENTS

| | | | |
|---|---|---|---|
| 3,233,017 | 2/1966 | Weaver et al. | 106—58 |
| 3,238,051 | 3/1966 | Weaver et al. | 106—58 |

JAMES E. POER, *Primary Examiner.*

HELEN M. McCARTHY, TOBIAS E. LEVOW,
*Examiners.*